United States Patent [19]
Paine

[11] Patent Number: 5,423,224
[45] Date of Patent: Jun. 13, 1995

[54] STRAIN MEASURING APPARATUS

[76] Inventor: Alan Paine, P.O. Box 1452, W. Covina, Calif. 91791

[21] Appl. No.: 179,606

[22] Filed: Jan. 10, 1994

[51] Int. Cl.[6] .............................................. G01B 7/16
[52] U.S. Cl. ........................................ 73/855; 73/765
[58] Field of Search ............... 73/789, 788, 855, 765, 73/849; 33/DIG. 13

[56] References Cited

U.S. PATENT DOCUMENTS

| | | | |
|---|---|---|---|
| 3,853,000 | 12/1974 | Barnett et al. | 73/763 |
| 3,956,927 | 5/1976 | Pearson | 73/855 |
| 3,965,736 | 6/1976 | Welton et al. | 73/151 |
| 4,213,348 | 7/1980 | Reinertson et al. | 73/765 |
| 4,223,443 | 9/1980 | Bachmann et al. | 73/781 |
| 4,522,066 | 6/1985 | Kistler et al. | 73/855 |
| 4,553,872 | 11/1985 | Chandra et al. | 73/855 |
| 5,028,807 | 7/1991 | Kawai et al. | 73/855 |
| 5,182,946 | 2/1993 | Boughner et al. | 73/151 |

Primary Examiner—Herbert Goldstein
Assistant Examiner—James M. Olsen
Attorney, Agent, or Firm—James E. Brunton

[57] ABSTRACT

A clamp-on structural strain-gage sensor that is mounted to dynamic load-bearing structures, such as sucker-rod type oil well pumps, to produce an electrical output proportional to the deflection of such structures. The apparatus uniquely includes an active electronic temperature correcting circuit to provide compensation for the erratic effects caused by uneven thermal heating of the load-bearing structure.

12 Claims, 3 Drawing Sheets

STRAIN MEASURING APPARATUS

BACKGROUND OF THE INVENTION

1. Field of the Invention

The present invention relates generally to strain-gage sensors. More particularly, the invention is concerned with sensors that are mounted to dynamic load-bearing structures, such as sucker-rod type oil well pumps, to produce an electrical output proportional to the deflection of such structures.

2. Discussion of the Invention

Oil well pumping units sometimes require a system to accurately determine fluid pounds in the well. This information is primarily required on wells that pump off, that is wells that do not contain enough fluid to permit them to be pumped continuously. A system of pump-off control, called "P.O.C." is used on these wells. A P.O.C. consists of either a load cell installed on the pumping rod, or a sensor mounted on the walking beam which detects deflection or load while the pump is operating. Typically the sensor interfaces with the controller to produce information for well analysis. Such systems not only provide information concerning the amount of fluid in the well, but also shut the pump down when the well is empty, thereby avoiding excess wear on the pumping equipment and saving energy. The P.O.C. system also protects the well if there is a malfunction in the sucker rod string or drive train by shutting the pump down when it detects such malfunctions.

A device for use in measuring strain in the polish rod of a rod-pumped well unit is disclosed in U.S. Pat. No. 3,965,736 issued to Welten, et al. Discussed in this patent is a system utilizing a strain-gage transducer welded to the top flange of the walking beam of an oil well pumping unit. In systems of this type, the sensor is welded to the walking beam in order to achieve maximum sensitivity. However, because the apparatus of the present invention is five to ten times more sensitive than that of the prior art welded systems, the sensor can be affixed to the load bearing surface of the walking beam or at any convenient location using conventional clamps. The advantage of clamps over welding are many, but especially advantageous is the ease of installation and removal of the sensor for repair or replacement. The extra sensitivity provided by the apparatus of the present invention also enables it to be used on very "light" or shallow wells where less sensitive sensors have not been effective.

Another major drawback of the prior art strain-gage beam sensors is their inability to compensate for temperature induced strain on the structure. Infrared radiation from the sun is especially troublesome because it causes uneven heating and radical expansion of the steel structure, or walking beam. Attempts have been made to solve this problem by painting the sensor black and by trying to closely match the material of the sensor with that of the structure to attempt to achieve the same thermal coefficient of expansion. However, such attempts have been generally unsuccessful. The present invention uniquely overcomes this problem by providing a novel, active electronic temperature correcting circuit.

SUMMARY OF THE INVENTION

It is an object of the present invention to provide a device that, when clamped to a load-bearing structure, such as that of a sucker rod type oil well pump, will give an electrical output precisely proportional to load in tension and compression.

Another object of the invention is to provide a device of the character described which is extremely sensitive so that it can be clamped to the load-bearing structure, thus obviating the need for welding the device to the structure. This unique feature enables the device to be quickly and easily installed and removed from the structure.

Another object of the present invention is to provide a sensor of a two-part design thereby further enabling its easy installation and removal.

Another object of the invention is to provide compensation for the erratic effects caused by uneven thermal heating of the structure being measured.

The foregoing objects can be achieved by a two-part device comprising a deflection collector base, which is clamped directly to the load-bearing structure, and a strain-gage sensor which is mounted on the collector base. The deflection collector base is uniquely constructed so that it concentrates movement of the structure into the specific area at which the small strain-gage sensor is mounted. This strain-gage sensor is also constructed so as to act as a mechanical amplifier. The two parts of the device, in combination, provide substantially greater sensitivity than has been heretofore possible with prior art devices.

The novel sensor of the apparatus of the present invention uses bonded foil strain gages in a Wheatstone bridge configuration and is constructed from stainless steel. The support, which is environmentally protected by encapsulants and a closure cover, fits into two angled loading wedges which are cut into the deflection collector base. These wedges effectively transfer the tensile and compressive loads from the base to the sensor, thus relieving the bolts from effecting the transfer. The bolts being primarily in tension require only moderate tightening and are not likely to loosen even after many cycles.

The sensor itself is wired to a watertight junction box that houses the active electronic temperature correcting circuit which uses various I.O. operational amplifiers and passive components. When the sensor is energized with precise voltage from the controller, the circuit electronically takes the signal from the output of the sensor and automatically modifies the offset, whether plus or minus, to a preset, positive number close to zero. This is necessary because installation of any structural sensor causes the zero to change.

While the pumping unit is working, the apparatus of the present invention precisely senses stress range to its minimum (downstroke) and maximum (upstroke). The active electronic temperature correcting circuit is continually making any positive number drift, at a predetermined and adjustable rate, back to the preset number close to zero. The upstroke in a typical pumping unit (6 to 14 cycles per minute) is too rapid to be adversely affected by this drift. The circuit never allows a negative number to reach the controller. Any negative signal is immediately added back to keep the preset number the same. The delta between minimum and maximum load remains basically unchanged, regardless of temperature induced strain, because the drift rate is faster than the changes made by the effects of the weather conditions on the structure.

DESCRIPTION OF THE INVENTION

Figure 1:
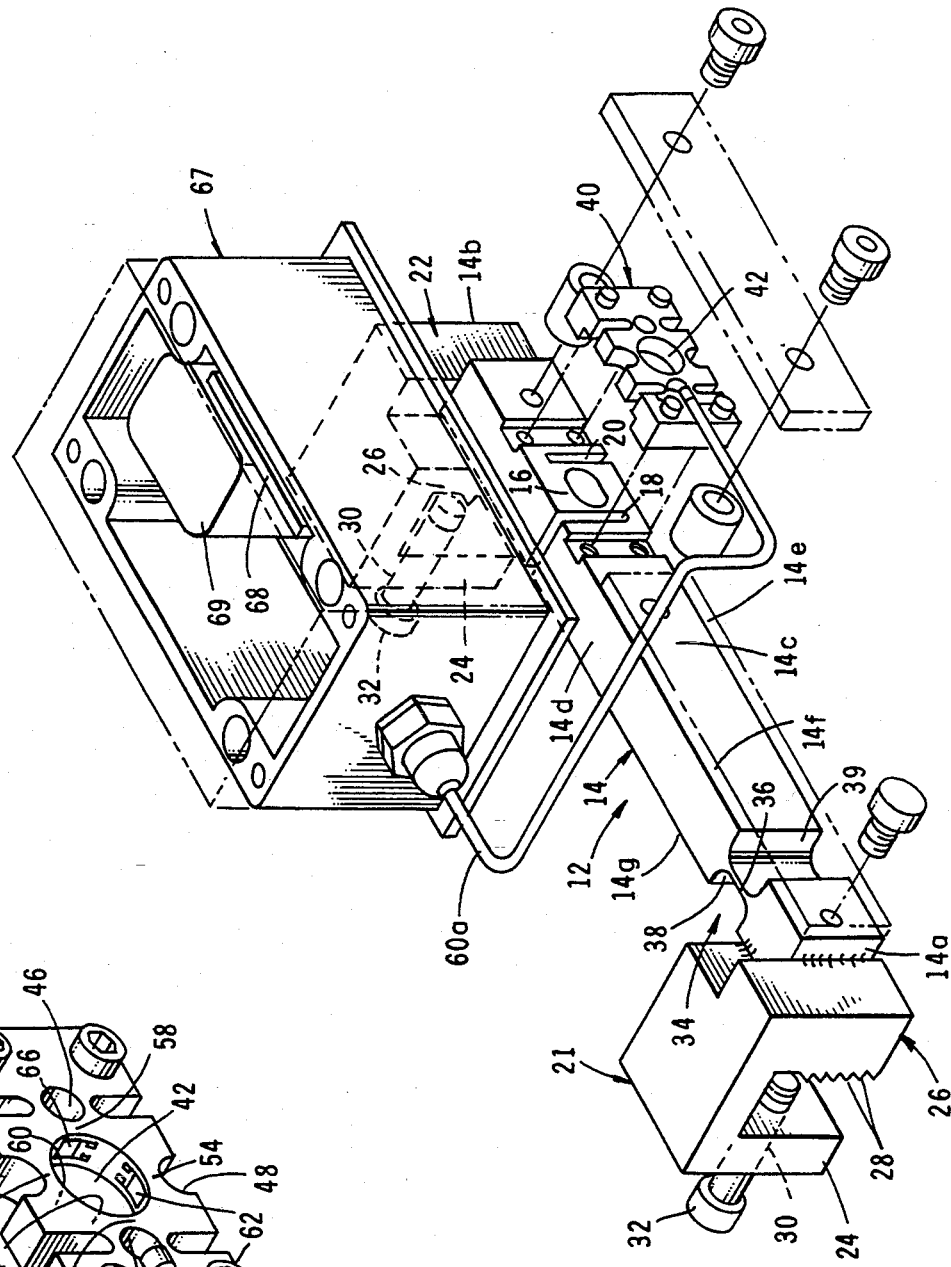
FIG. 1 is a generally isometric view of one form of the strain-measuring apparatus of the present invention for measuring deflection in dynamic load-bearing structures such as that of a sucker rod-type oil well pump.

Referring to the drawings and particularly to FIG. 1, the preferred embodiment of the strain-measuring apparatus of the present invention is there illustrated. The apparatus of FIG. 1 is designed to be attachably interconnected with a structural beam of a dynamic load-bearing structure such as a walking beam of a rod pumped well unit of the type commonly used to produce oil from a subterranean formation. Such units typically include a down-hole pump attached to a reciprocal rod string extending to the surface and include a prime mover for driving a walking beam or the like to which the polish rod of the rod string is interconnected. The apparatus of the present embodiment of the invention comprises two main components, one being a deflection collector base assembly generally designated in FIG. 1 by the numeral 12 and a sensor means for sensing deflection in a flexure area of a base member 14 which forms a part of the deflection collector base assembly. Base member 14 comprises an elongated, bar-like member having first and second ends 14a and 14b and an intermediate portion 14c. Forming a part of intermediate portion 14c of the base member is a first flexure area 16. First flexure area 16 is located between two longitudinally, spaced-apart slots 18 and 20. Slot 18 extends downwardly from the top surface 14d of member 14 while slot 20 extends upwardly from lower surface 14e of member 14. The function of first flexure area 16 will presently be described.

Provided proximate ends 14a and 14b of base member 14 are clamping means for clamping the deflection collector base to a structural beam of the dynamic load-bearing structure such as the walking beam of a rod pumped well unit. The clamping means of the present form of the invention comprises first and second clamping members 21 and 22 respectively which are interconnected within ends 14a and 14b respectively of base member 14. Each of the clamping members 21 and 22 include first and second spaced apart jaws 24 and 26. Each jaw 26 is provided with a multiplicity of gripping protuberances or teeth 28. Each of the jaws 24, on the other hand, is provided with a threaded aperture 30 which is adapted to threadably receive a threaded bolt 32 which here forms a portion of the clamping means of the invention for urging the structural beam into clamping engagement with teeth 28 of jaw 26.

In the form of the invention illustrated in FIG. 1, the intermediate portion 14c of base member 14 is also provided with a second flexure area 34 which comprises a thin wall 36 that is disposed between first and second cut-out portions 38 and 39 formed in side walls 14f and 14g of member 14. Flexure wall 36 preferably moves approximately 0.005 inches per pound across the wall. This permits bending of base member 14 in this area instead of in flexure area 16. This unique feature of the apparatus helps to prevent the sensor means from mechanical overload and makes the first bending flexure area 16 primarily sensitive to tension and compression forces rather than to bending forces.

Figure 2:
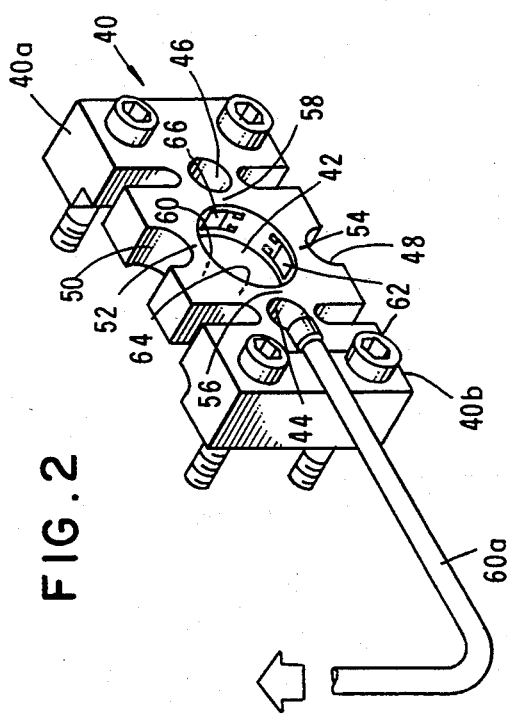
FIG. 2 is a generally isometric view of the sensor means of the invention for sensing deflection in the dynamic load-bearing structure.

Turning now to FIG. 2, sensor means of the present form of the invention comprises a sensor base 40 which is preferably formed from a section of stainless steel plate. Sensor base 40 is provided with a plurality of cut-out portions which define a plurality of thin wall areas which foil strain gauges are affixed in a manner now to be described.

Figure 3:
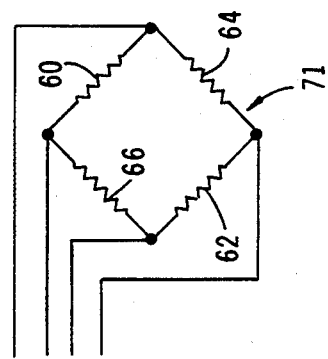
FIG. 3 is a generally diagrammatic view illustrating the manner of interconnection of the strain gauges which form a part of the sensor means of the invention.

As shown in FIG. 2, sensor base 40 is provided with a central aperture 42 and a pair of apertures 44 and 46 which are located on either side of central aperture 42. Provided in the top and bottom walls 40a and 40b respectively of base 40 are semi-circular, cut-out portions 48 and 50. These cut-out portions form in conjunction with central aperture 42 first and second thin-wall portions 52 and 54 respectively. Formed between apertures 44 and 46 and central aperture 42 are third and fourth thin-wall portions 56 and 58 respectively. The previously identified strain gauge sensors are interconnected with sensor base 40 in these thin-wall areas. More particularly, a first sensor 60 is affixed proximate thin-wall portion 52 and a second sensor 62 is affixed proximate thin-wall section 54. Similarly, a sensor 64 is affixed proximate thin-wall section 56 and a sensor 66 is affixed proximate thin-wall section 58 (see also FIG. 3). Each of the sensors 60, 62, 64 and 66 comprise foil strain gauges of a character readily commercially available and are bonded to the thin-wall sections of the sensor base with an appropriate adhesive such as an epoxy glue and are heat cured in position. Foil strain gauges may be platinum, tungsten/nickel, chromium of the character readily commercially available from Muse Measurements of San Dimas, Calif. As best seen in FIG. 3, the thin-foil strain gauges are then wired in a typical Wheatstone bridge configuration as shown in FIG. 3. Thinwall portions 52, 54, 56 and 58 respond to tension and compression loading across their length. The load varies depending upon the deflection transmitted from the structure through base member 14 to the sensor means or strain gauges 60, 62, 64, and 66. The range of force needed to deflect the sensor for a typical application is between zero and approximately 50 pounds. Signal output and deflection is approximately 0.00025 inches of deflection equaling 0.10MV/V. It is to be understood that for certain applications, semi-conductor gages can be used in place of the foil strain gages. Additionally, the sensor itself can be affixed by any suitable means such as welding or by the use of mechanical fasteners if clamping is for any reason undesirable.

Figure 5A:
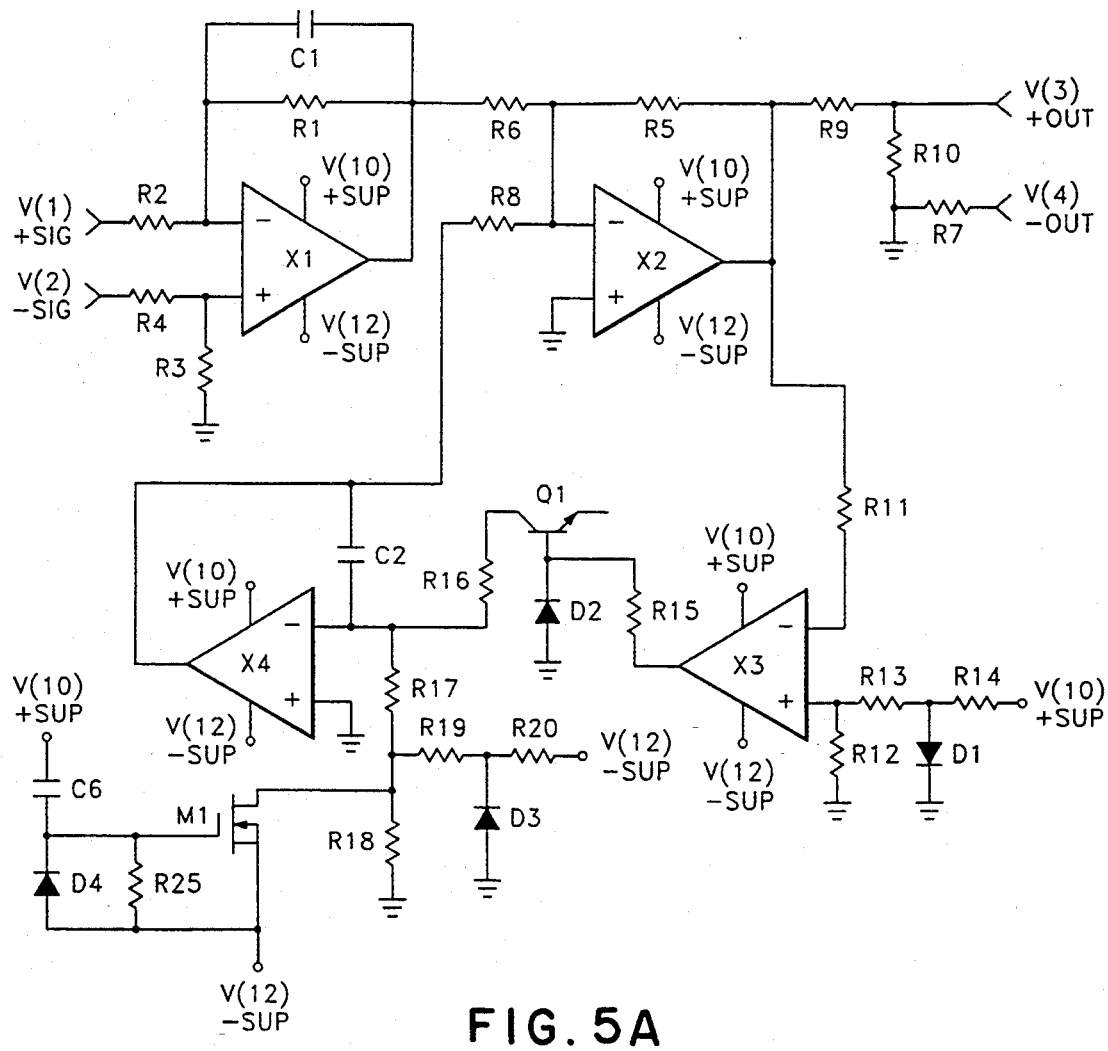
FIG. 5a, 5b and 5c are a general schematic circuit diagram of the electronic circuitry of the apparatus of the invention.
Figure 5B:
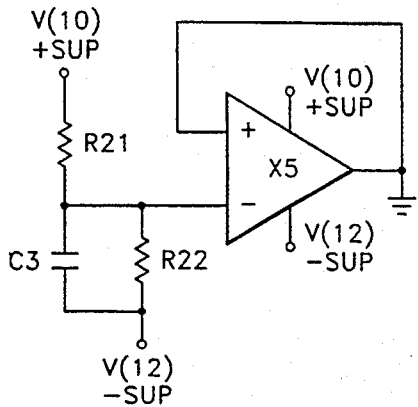
Figure 5C:
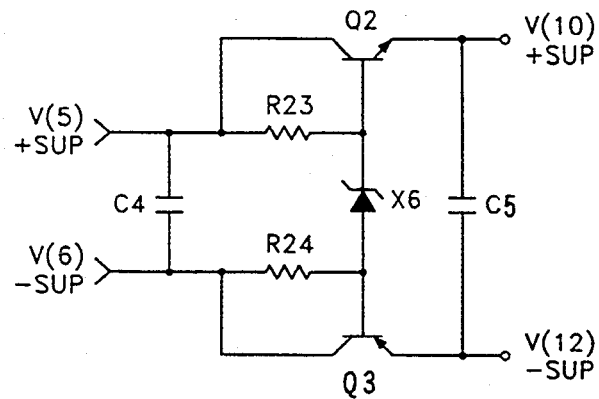

As previously mentioned, the sensor itself is wired via connector 60a to a watertight junction box or housing 67 (FIG. 1) that houses the active electronic temperature correcting circuit 68 which uses various operational amplifiers and passive components of the character shown in FIGS. 5a, 5b and 5c and as will presently be described in greater detail. Housing 67 also houses an inclinometer 69 which indicates the incline of the structure.

While the pumping unit is working, the apparatus of the invention precisely senses stress at its minimum (downstroke) and maximum (upstroke). The active electronic temperature correcting circuit 68 is continually making any positive number drift, at a predetermined and adjustable rate, back to the preset number close to zero. The upstroke in a typical pumping unit (6 to 14 cycles per minute) is too rapid to be adversely affected by this drift. The circuit never allows a negative number to reach the controller. Any negative signal is immediately added back to keep the preset number the same. The delta between minimum and maximum load remains basically unchanged, regardless of temperature induced strain, because the drift rate is faster than the changes made by the effects of the weather conditions on the structure.

Figure 4:
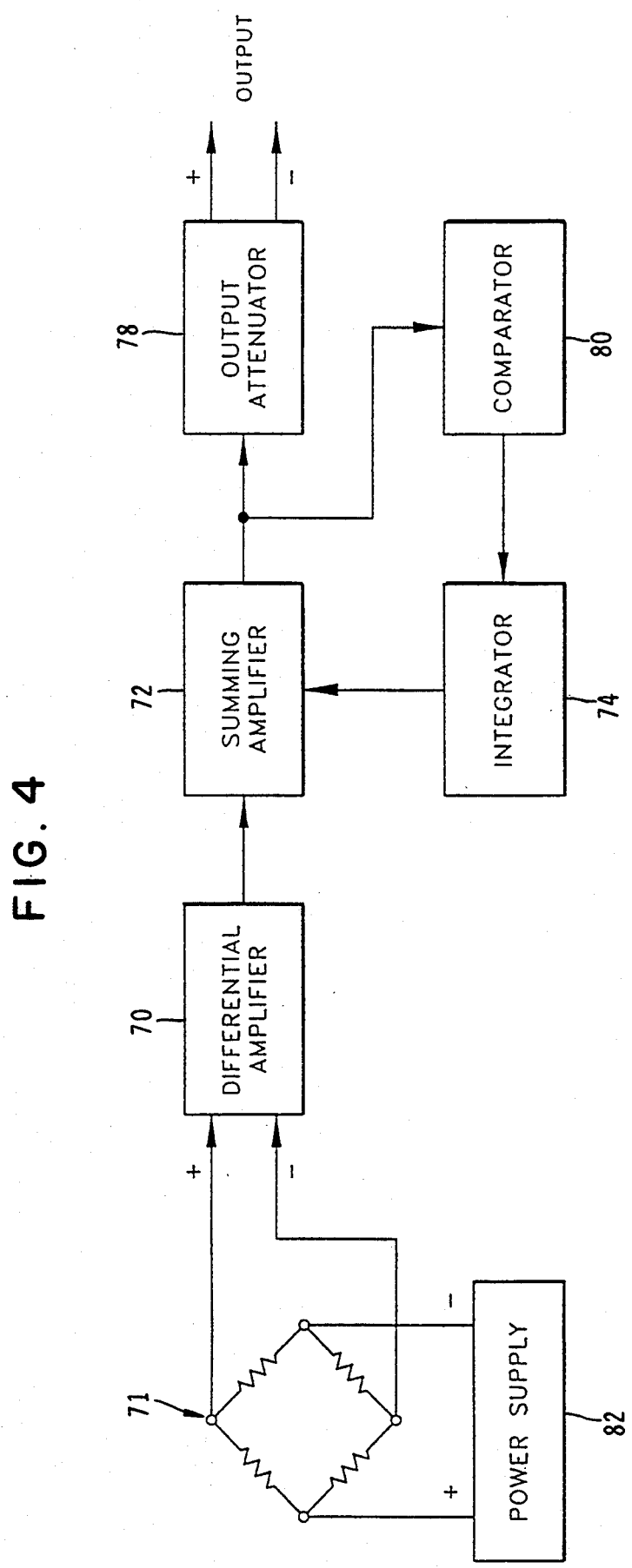
FIG. 4 is generally schematic block diagram of the various electronic components of the apparatus used for measuring deflection of the dynamic load-bearing structure.

Turning now to FIGS. 4, 5a, 5b and 5c, the differential amplifier 70 is connected to the bridge configuration 71 shown in FIGS. 4 and 5a and differential signal from the strain gauge sensors to a single ended ground referenced signal. The differential amplifier also provides gain so that succeeding stage's noise contributions are negligible and function to filter out high frequency signals from sources such as vibration which could affect the output offset set point.

The gain of the differential amplifier stage is chosen so that the output swing limits of the operational amplifier X1 (FIG. 5a) are observed. Since the summing amplifier 72 (FIG. 4) inverts the output of the differential amplifier, the sensor signal wires are reversed to provide a negative going output. The operational amplifier X1 comprises a very high accuracy instrument grade amplifier having low density, low input bias currents, low input offset voltage, a high common mode rejection ratio, and high loop gain. Such an operational amplifier is readily commercially available from Analog Devices of Norwood, Ma. Connected to amplifier X1 in the manner shown in FIG. 5a are resistors R1, R2, R3, and R4. These resistors are differential and common mode, gain setting resistors having a low temperature coefficient, good ratio matching and high accuracy. Such resistors are readily commercially available from a number of sources including Dow Radio of Pasadena, Calif. Capacitor C1, which is connected across R1 is a standard commercially available roll off capacitor.

The summing amplifier 72 linerally sums the output from the differential amplifier and the output from the integrator 74. Where:

$V_{out}$ = Output Voltage
$V1$ = Input Voltage 1
$AV1$ = Gain for Input Voltage 1
     = $R5/R6$
$V2$ = Input Voltage 2
$AV2$ = Gain for Input Voltage 2
     = $R5/R8 - [(AV1)(V1 + AV2)(V2)]$ Amplifier X2 (FIG. 5a) comprises a high accuracy operational Amplified having:

Low drift, row input bias currents, row input offset voltage and high open loop gain. Resistors R5, R6 and R8, which are connected to amplifier X2 are gain setting resistors having low temperature coefficient and good ratio matching. Such resistors are also readily commercially available.

The output attenuator 78 (FIG. 4) attenuates the output from the summing amplifier 72 so that the total gain from the differential amplifier through the summing amplifier is equal to 1 which preserves the original sensitivity of the strain gauge. The output impedance of attenuator 78 is on the order of 350Ω, which minimizes errors when driving instrumentation that is expecting a 350Ω Wheatstone bridge. A secondary function of output attenuator 78 to protect the output stages of X2 and X5 from hazardous electrical potentials.

Where:

$V_{out}$ = Output voltage
$V_{in}$ = Input voltage
$Att$ = Attenuation factor
     = $R10/(R9 - R10)$ Then:

$$V_{out} = (V_{in})(Att)$$

And:

$$Z_{out} = \frac{1}{[1/R9] + [1/R10]}$$

Where:

$Z_{out}$ = Output Impedance

Resistors R7, R9, and R10 are attenuation and output impedance setting resistors having low temperature coefficient, good ratio matching and high accuracy.

Comparator 80, which is connected in the manner shown in FIG. 4, generates a signal for the offset integrator whenever the signal level from the summing amplifier goes below a selected reference voltage.

The network consisting of resistors R12, R13 and R14 and diode D1 provide a stable reference voltage at the non-inverting input of X3. X3 compares this voltage to the output of the summing amplifier. (See FIG. 5a).

In operation, when the output of the summing amplifier 72 is less than the reference voltage, the output of X3 goes high, reverse biasing D2 and forward biasing the collector-base junction of Q1 which here comprises a transistor used as a low reverse current diode. This causes a current determined by R16 to flow into the summing junction of the offset integrator 74. Since there is no feedback path around the operational amplifier, it runs in the open loop mode and the output voltage goes to the positive supply voltage.

When the output of summing amplifier 72 is more than the reference voltage, the output of X3 goes low, reverse biasing the collector-base junction of Q1 and forward biasing clamping diode D2. D2 clamps the output of X3 to about 0.6 volts below ground. This minimizes the reverse bias on Q1 which further lowers its already low leakage. With a reverse bias across the collector-base junction of Q1, virtually no current flows out of the summing junction of Offset Integrator 74.

The output of summing amplifier 72 is used instead of the output from attenuator 74 because the signal level is much higher, which lowers the noise and offset error contributions of operational amplifier X3. Resistor R11 is an input bias current compensation resistor while R12 and R13 form a voltage divider. R14 is a bias resistor for D1. Resistors R12 through R14 along with diode D1 comprise the reference offset voltage network (FIG.5a). Resistors R11 through R14 are readily commercially available from sources such as Mouser Electronics of Mansfield, Tex. Resistor R15 is a current-limiting resistor of the character also available from Mouser Electronics.

The offset integrator 74 holds the offset to be added to the sensor output via the summing amplifier. The signal coming from offset comparator 80, when it detects an output voltage below the reference voltage, causes integrator 74 to ramp negative and summing amplifier 72 output to ramp positive until the output voltage is no longer below the reference voltage.

The integrator reset time is controlled by the network composed of R17 through R20 and D3 which removes a small stable current from the summing node of the integrator, causing the integrator to drift positive at a controlled rate. The summing amplifier inverts this signal after adding it to the output of the input amplifier which results in a negative drift at the summing amplifier output.

During power up, the circuit composed of M1, C6, R25, and D4 increase the current pulled from the summing node of the integrator for a short amount of time. This prevents the integrator from accumulating a large offset during power up which would take a long time to settle. A MOSFET is used for M1 instead of a NPN bipolar junction transistor in order to minimize the bias current supplied by the timing network made up of C6 and R25.

Resistor R18 and R19 form a voltage divider and R20 biases diode D3. Resistor R17 removes a precise amount of current from the summing junction of X4. Resistors R17 through R20 are readily commercially available from Dow Radio of Pasadena, Calif.

D3 is a clamping diode while C2 is an integrating capacitor. The offset drift network of the circuit is comprised of resistors R17 through R20 and D3. M1 is a N channel MOSFET of a character available from a number of commercial sources including Dow Radio.

R25 is a timing resistor, C6 is a timing capacitor and D4 is a discharge diode for C6. These components combine to make up the reset timing network of the circuit.

Maintaining low integrator drift throughout the temperature extremes expected in the field requires that operational amplifier X4 have very low input bias currents, C2 have very low leakage, and Q1 have very low reverse leakage.

If the bias current of the operational amplifier is enough to cancel the effects of the drift current injected by R17, then the integrator could drift negative which would cause the output of the summing amplifier to drift positive. This will prevent correct circuit operation since the negative peaks of the input signal will no longer be maintained at the selected offset.

Almost all bipolar input operational amplifiers have an input bias current an order of magnitude too large to work in this circuit. Most JFET and MOSFET input operational amplifiers have a low enough input bias current at 25° C. but since their input currents double every 10° C. at 100° C., they have even higher input bias currents than bipolar operational amplifiers. There are several specialty FET amplifiers however that have 25° C. input bias currents lower than 300 femtoamps which work perfectly in this application.

Leakage in capacitor C2 causes the output of the integrator to drift toward zero volts at a rate determined by the magnitude of the output voltage. Polypropylene, teflon, and polycarbonate capacitors with suitably low leakages work well. Polystyrene would work well but is restricted to lower operating temperatures.

Transistor collector-base junctions make excellent if slow low leakage diodes. Q1 is used in place of a low leakage diode for simplicity and cost. Gold doped transistor will have higher leakage but may still work well. Leakage currents of 5 picoamps at 15 Vcbo are common.

The power supply 82 of the present form of the invention regulates and filters the power supplied to the rest of the circuitry. The power supply also prevents catastrophic failure due to overvoltage conditions.

A balanced regulation scheme is used to place the operational amplifier input and output voltage ranges midway between the supply voltages. Q2 and Q3 run as emitter followers to buffer the voltage across zener diode X6. In the circuit shown in the drawings Q2 is an NPN Pass Transistor, Q3 is a PNP Pass Transistor and X6 is a Zener Diode. Capacitor C4 is an Input Filter Capacitor which bridges Resistors R23 and R24, while capacitor C5 is an Output Filter Capacitor.

Also forming a part of the circuit is a railsplitter which provides a low impedance ground midway between the positive and negative supply rails for the rest of the circuitry.

In operation, resistors R21 and R22 divide the supply voltage in half. X5 is configured as a voltage follower to buffer this voltage and prevent loading on the voltage divider. C3 serves to remove noise and transients from the divided voltage.

X5 is an operational amplifier which is used as a voltage follower, while C3 is a filter capacitor.

Resistors R21 and R22 are voltage divider resistors of the character readily available from Mouser Electronics.

By way of summary, the circuit of the invention as shown in the drawings compensates for thermally induced zero drift in a wheatstone bridge by adding a variable offset to the output of the bridge. An arbitrary zero level is selected. Whenever the output of the wheatstone bridge is lower than this level, the variable offset is raised so that the total of the two is no longer lower than the arbitrary zero level. This has the effect of making the lowest output level of the wheatstone bridge equal to the arbitrary zero level which was selected.

If the bridge zero should drift negative, the correction circuit will just make the variable offset a little larger to compensate. If the bridge zero should drift positive, however, the point of lowest amplitude will move up and a positive drift will result. In order to remove positive drifts, the variable offset which is added to the output of the wheatstone bridge has a very small negative drift which compensates for any positive drifts from the bridge but which does not degrade the accuracy overmuch.

More particularly, in actual operation, the differential bridge output is first converted into a single ended signal to facilitate the addition of a second relatively constant variable offset. The total of the two signals is then converted back into a differential voltage in order to fully simulate the output of a wheatstone bridge for the following instrumentation.

The variable offset is held in a very low drift integrator. The integrator has a very small negative drift to compensate for positive drifts in the wheatstone bridge. A comparator circuit triggers whenever the output drops below an arbitrary zero level and raises the output of the integrator. During power up, the negative drift of the integrator is temporarily enhanced in order to initially zero out any large zero offsets from the wheatstone bridge.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A strain measuring apparatus for measuring deflection in dynamic, load-bearing structures having a structural beam, comprising:
   (a) a deflection collector base for collecting stresses caused by deflection of the load-bearing structures, said base including:
      (i) an elongated base member having a first end, a second end and an intermediate portion disposed between said first and second ends, said intermediate portion having a first flexure area disposed intermediate first and second spaced-apart slots formed in said base member, said base member collecting along its length tension and compression stresses caused by movement of the load-bearing structures and concentrating said stresses in said first flexure area; and
      (ii) clamping means disposed proximate said first and second ends of said base member for clamping said deflection collector base to the structural beam;
   (b) sensor means for sensing deflection in said flexure area of said base member of said deflection collector base resulting from movement in said load-bearing structures; and
   (c) temperature compensating means for compensating for temperature induced strain on the dynamic load-bearing structure.

2. An apparatus as defined in claim 1 in which said sensor means comprises:
   (a) a sensor base having a plurality of cut-out portions defining a plurality of thin-wall areas in said sensor base;
   (b) a plurality of foil strain gauges affixed to said sensor base proximate said thin areas; and
   (c) connector means for connecting said sensor base to said base member of said deflection collector base proximate said first flexure area.

3. An apparatus as defined in claim 1 in which said clamping means of said deflection collector base comprise first and second clamping members integrally formed with said base member, each of said clamping members comprising first and second spaced apart jaws defining a structural beam receiving opening therebetween and clamping means for urging at least one of said first and second jaws into clamping engagement with the structural beam.

4. An apparatus as defined in claim 1 in which said intermediate portions of said base member includes spaced-apart side walls and a second flexure area comprising a thin-wall area disposed between first and second cut-out portions provided in said side walls.

5. An apparatus as defined in claim 1 in which said temperature compensating means comprises a temperature compensating circuit including a wheatstone bridge, said circuit further including means for compensating for thermally induced zero drift in said wheatstone bridge by adding a variable offset to the output of said wheatstone bridge.

6. A strain measuring apparatus for measuring deflection in dynamic, load-bearing structures having a structural beam, comprising:
   (a) a deflection collector base for detecting strain caused by movement in the load-bearing structures, said base including:
      (i) a base member having a first end, a second end and an intermediate portion disposed between said first and second ends, said intermediate portion having a first flexure area disposed intermediate first and second spaced-apart slots formed in said base member, said base member being adapted to collect along its length strain caused by movement of the load-bearing structures and to concentrate said strain in said first flexure area; and
      (ii) clamping means disposed proximate said first and second ends of said base member for clamping said deflection collector base to the structural beam;
   (b) sensor means for sensing deflection in said flexure area of said base member of said deflection collector base, resulting from movement in said load-bearing structure said sensor means comprising:
      (i) a sensor base having a plurality of cut-out portions defining a plurality of thin-wall areas in said sensor base;
      (ii) a plurality of foil strain gauges affixed to said sensor base proximate said thin areas; and
      (iii) connector means for connecting said sensor base to said base member of said deflection collector base proximate said first flexure area; and
   (c) temperature compensating means including a wheatstone bridge for compensating for temperature induced strain on the dynamic load-bearing structure.

7. An apparatus as defined in claim 6 in which said clamping means of said deflection collector base comprise first and second clamping members affixed to said base member, each of said clamping members comprising first and second spaced apart jaws defining a structural beam receiving opening therebetween and clamping means for urging at least one of said first and second jaws into clamping engagement with the structural beam.

8. An apparatus as defined in claim 7 in which said intermediate portion of said base member includes spaced-apart side walls and a second flexure area comprising a thin-wall area disposed between first and second cut-out portions provided in said side walls.

9. A strain measuring apparatus for measuring deflection in dynamic, load-bearing structures having a structural beam, comprising:
   (a) a deflection collector base for collecting and concentrating stresses caused by movement in the load-bearing structures, said base including:
      (i) an elongated base having a first end, a second end and an intermediate portion disposed between said first and second ends, said intermediate portion having a first flexure area disposed intermediate first and second spaced-apart slots formed in said base member, said base member collecting along its length tension and compression stresses caused by movement of the load-bearing structures and concentrating said stresses in said first flexure area; and
      (ii) clamping means disposed proximate said first and second ends of said base member for clamping said deflection collector base to the structural beam, said clamping means comprising first and second clamping members affixed to said base member, each of said clamping members comprising first and second spaced-apart jaws defining a structural beam receiving opening therebetween and clamping means for urging at least one of said first and second jaws into clamping engagement with the structural beam;

(b) sensor means for sensing deflection in said flexure area of said base member of said deflection collector base, said sensor means comprising:

(i) sensor base having a plurality of cut-out portions defining a plurality of thin-wall areas in said sensor base resulting from movement in said load-bearing structure;

(ii) a plurality of foil strain gauges affixed to said sensor base proximate said thin areas; and (iii) connector means for connecting said sensor base to said base member of said deflection collector base proximate said first flexure area; and (c) temperature compensating means for compensating for temperature induced strain on the dynamic load-bearing structure, said temperature compensating means comprising:

(i) a wheatstone bridge; and (ii) means for compensating for thermally induced zero drift in said wheatstone bridge by adding a variable offset to the output of said wheatstone bridge.

10. An apparatus as defined in claim 9 in which said intermediate portion of said base member includes spaced-apart side walls and a second flexure area comprising a thin-wall area disposed between first and second cut-out portions provided in said side walls.

11. A strain measuring apparatus for measuring deflection in dynamic, load-bearing structures having a structural beam, comprising:

(a) deflection collector means for collecting and concentrating tension and compression stresses caused by deflection of the load-bearing structures, said collector means including:

(i) an elongated base member having an upper surface, a lower surface, a first end, a second end, and an intermediate portion disposed between said first and second ends, said intermediate portion having a first flexure area disposed intermediate first and second spaced-apart slits formed in said base member, said base member collecting along its length both tension and compression stresses caused by movement of the load-bearing structures and concentrating said stresses in said first flexure area; and (ii) clamping means disposed proximate said first and second ends of said base member for clamping said deflection collector base to the structural beam;

(b) sensor means for sensing deflection in said flexure area of said base member of said deflection collector base resulting from movement in said load-bearing structures; and (c) temperature compensating means for compensating for temperature induced strain on the dynamic load-bearing structure.

12. An apparatus as defined in claim 11 in which said first slit extends from said upper surface of said base member toward said lower surface and in which said second slit extends from said lower surface of said base member toward said upper surface thereof.

* * * * *